US 9,369,511 B2

(12) United States Patent
Heatley et al.

(10) Patent No.: US 9,369,511 B2
(45) Date of Patent: Jun. 14, 2016

(54) TELECOMMUNICATION NETWORK

(71) Applicant: STARLEAF LTD, Cambridge (GB)

(72) Inventors: Richard Piers Heatley, Camrbidge (GB); Samuel Thomas Jansen, Newmarket (GB); Mark Ross Thompson, Cambridge (GB)

(73) Assignee: STARLEAF LTD, London (GB)

( * ) Notice: Subject to any disclaimer, the term of this patent is extended or adjusted under 35 U.S.C. 154(b) by 0 days.

(21) Appl. No.: 14/202,583

(22) Filed: Mar. 10, 2014

(65) Prior Publication Data

US 2014/0307042 A1 Oct. 16, 2014

Related U.S. Application Data

(60) Provisional application No. 61/782,327, filed on Mar. 14, 2013.

(30) Foreign Application Priority Data

Mar. 14, 2013 (GB) .................................. 1304646.1

(51) Int. Cl.
*H04N 7/15* (2006.01)
*H04L 29/06* (2006.01)
(Continued)

(52) U.S. Cl.
CPC .......... *H04L 65/607* (2013.01); *H04L 12/1827* (2013.01); *H04L 65/1046* (2013.01);
(Continued)

(58) Field of Classification Search
CPC .......................... H04L 65/1046; H04L 65/607
USPC ..................................................... 348/14.08
See application file for complete search history.

(56) References Cited

U.S. PATENT DOCUMENTS 7,227,938 B2 * 6/2007 Rodman ................. H04L 12/66
370/229
2003/0081112 A1 5/2003 Sheldon et al.
(Continued)

FOREIGN PATENT DOCUMENTS

EP 1 320 261 A1 6/2003

OTHER PUBLICATIONS

"Starleaf Call Smashes Through the Barriers to Business Video Calling and Conferencing" dated Jan. 24, 2013 in 2 pages.
(Continued)

*Primary Examiner* — Creighton Smith
(74) *Attorney, Agent, or Firm* — Knobbe Martens Olson & Bear LLP

(57) ABSTRACT

A telecommunication network 9 for video conference calls comprises: devices including: a plurality of telecommunication end-point devices 35,36,38,39; and a plurality of data streaming devices 33,40 each for streaming encoded data from at least one of the telecommunication end-point devices 35,36,38,39 to at least one other of the data streaming devices 33,40 and/or to at least one other of the telecommunication end-point devices 35,36,38,39. The telecommunication network further comprises a controller 34 for controlling: forming of telecommunication connections between at least some devices on the network; and data streams along the formed telecommunication connections. The telecommunication network 9 is configured such that the controller 34 controls: the forming of a telecommunication connection between telecommunication end-point devices 35,36,38,39 via at least one of the data streaming devices 33,40; and encoded data streamed along the formed telecommunication connection between telecommunication end-point devices 35,36,38,39.

23 Claims, 4 Drawing Sheets

(51) Int. Cl.
*H04M 3/42* (2006.01)
*H04M 3/56* (2006.01)
*H04L 12/18* (2006.01)

(52) U.S. Cl.
CPC ............ *H04L65/403* (2013.01); *H04L 65/605* (2013.01); *H04M 3/4228* (2013.01); *H04M 3/562* (2013.01); *H04N 7/15* (2013.01); *H04N 7/152* (2013.01)

(56) References Cited

U.S. PATENT DOCUMENTS

| | | |
|---|---|---|
| 2007/0133436 A1 | 6/2007 | Provino et al. |
| 2010/0118110 A1 | 5/2010 | Choi |
| 2010/0208139 A1* | 8/2010 | Hii ................................ 348/571 |
| 2010/0231556 A1* | 9/2010 | Mines ...................... H04N 7/15 345/178 |
| 2012/0075408 A1 | 3/2012 | Dasgupta et al. |
| 2013/0300924 A1* | 11/2013 | Choi .............................. 348/441 |

OTHER PUBLICATIONS

Combined Search and Examination Report for Patent Application No. GB1304646.1 dated Sep. 10, 2013 in 4 pages.

GB Search Report for Application No. GB 1304646.1 dated Jul. 2, 2015 in 3 pages.

\* cited by examiner

PRIOR ART FIGURE 2

TELECOMMUNICATION NETWORK

CROSS-REFERENCE TO RELATED APPLICATIONS

This application claims the benefit of U.S. Provisional Patent Application No. 61/728,327, filed on Mar. 14, 2013. This application also claims the benefit of United Kingdom Patent Application No. GB1304646.1, filed on Mar. 14, 2013. The disclosures of these applications are hereby incorporated by reference herein in their entireties and made a part of the present disclosure.

TECHNICAL FIELD

The present invention relates generally to a telecommunication network. Embodiments of the invention relate to a system for providing network-efficient videoconferencing facilities to a group of internet protocol enabled video telephony devices on the telecommunication network.

BACKGROUND

Videoconferences are currently created using conference bridges as part of a telecommunication network as illustrated in FIGS. 1 to 3.

FIG. 1 illustrates a typical telecommunication network 8 for a videoconference. It includes a multiparty conference bridge 13 with (in this example) three video endsystems (video telephony devices) 11 sending video streams to the conference bridge over the Internet 10 which sends back composite images to the three endsystems. This technique involves each video endsystem creating a connection to the conference bridge and streaming their compressed video to it. The conference bridge then decompresses the incoming video images and through policy or audio-level detection, calculates what arrangement of images should be sent back out to the endsystems. It then resizes, as necessary, the incoming images, constructs a new image which is a composite of the incoming images and compresses it. This process is repeated by the conference bridge for each video endsystem in the conference so that each has a unique composition of the incoming images.

FIG. 2 illustrates a telecommunication network 8 for a videoconference that uses a distributed conference bridge arrangement. In this arrangement, video endsystems (video telephony devices) 23 are connected to their local conference bridge 21 and video endsystems (video telephony devices) 24 are connected to another local conference bridge 22. The bridges connect together 25 via the Internet 10. This arrangement functions in a similar way to the single bridge arrangement of FIG. 1, but with the data processing carried out shared by the conference bridges.

FIG. 3 illustrates a telecommunication network for a small (3-party) videoconference where one of the endsystems (video telephony devices) 30 is used as a conference bridge for the three endsystems (video telephony devices) 30, 31 and 32. This arrangement functions in a similar way to the single bridge arrangement of FIG. 1, but with the data processing carried out by the video end system 30 used as a conference bridge.

These telecommunication networks for video conferencing require one or more conference bridges which perform large amounts of video decompression, scaling, composition and recompression. The processing power of this resource scales with the number of participants or endsystems in the conference requiring their own composition. Thus, none of these prior art conference bridge arrangements scale well. For large-scale multiparty videoconferencing to work, the choice has been to restrict the functionality of the endsystems to simplify the processing task of the bridge, or to increase the power and cost of the bridge to allow participants to keep the functionality they desire. Advantageously, the arrangement of FIG. 3 does not require a separate conference bridge or bridges (like the arrangements of FIGS. 1 and 2 respectively) but maintains the problem of scalability as regards large conferences.

SUMMARY

Embodiments of the invention address the problems of large-scale video conference calls by using a centralized control system, conference control system or controller which instructs the video endsystems or telecommunication end-point devices and low power optimised packet switches or data streaming devices to arrange for the appropriate video streams to be routed to the recipients (telecommunication end-point devices) that require them.

The invention in its various aspects is defined in the independent claims below to which reference should now be made. Advantageous features are set forth in the dependent claims.

Arrangements are described in more detail below and take the form of a telecommunication network for video conference calls that comprises: devices including: a plurality of telecommunication end-point devices; and a plurality of data streaming devices each for streaming encoded data from at least one of the telecommunication end-point devices to at least one other of the data streaming devices and/or to at least one other of the telecommunication end-point devices. The telecommunication network further comprises a controller for controlling: forming of telecommunication connections between at least some devices on the network; and data streams along the formed telecommunication connections. The telecommunication network is configured such that the controller controls: the forming of a telecommunication connection between telecommunication end-point devices via at least one of the data streaming devices; and encoded data streamed along the formed telecommunication connection between telecommunication end-point devices.

The controller, although behaving as if it is centralized, may be implemented as a distributed system.

Embodiments of the invention provide a method and system which enables videotelephony devices or end point devices on a network (for example, connected directly or indirectly to the Internet) to create multiparty conferences without the need for one or more centralized conference bridges of the prior art described above. Instead, a set of additional network devices in the form of data streaming devices are used which do not require video encoding capabilities and hence do not require large amounts of processing power. In this way, efficient use is made of the network infrastructure.

In an aspect of the present invention, there is provided a telecommunication network for telecommunication between telecommunication end-point devices on the telecommunication network, the telecommunication network comprising: devices including: a plurality of telecommunication end-point devices; and a plurality of data streaming devices each for streaming encoded data from at least one of the telecommunication end-point devices to at least one other of the data streaming devices and/or to at least one other of the telecommunication end-point devices; the telecommunication network further comprising a controller for controlling: forming of telecommunication connections between at least some devices on the network; and data streams along the formed telecommunication connections; the telecommunication network being configured such that the controller controls: the forming of a telecommunication connection between telecommunication end-point devices via at least one of the data streaming devices; and encoded data streamed along the formed telecommunication connection between telecommunication end-point devices.

The telecommunication end-point devices may be configured to send a plurality of data streams each at a different data rate along a formed telecommunication connection. The telecommunication end-point devices may be each configured to request the controller the data rate they desire. The data rate the end-point devices desire may be determined by one or more of: end-point device user choice, predetermined choice, network bandwidth or service level agreement.

The forming of telecommunication connections between at least some devices on the network may comprise the forming of telecommunication connections between three or more telecommunication end-point devices. One or more of the plurality of data streaming devices may be configured to stream encoded data to a plurality of telecommunication end-point devices. The one or more of the plurality of data streaming devices may be configured to stream encoded data to the nearest plurality of telecommunication end-point devices and/or plurality of telecommunication end-point devices with the lowest data transmission latency.

The conference controller may be configured such that if more than one telecommunication end-point device of the plurality of telecommunication end-point devices sharing a data streaming device each desires the same data stream then only one instance of the data stream is transmitted to the data streaming device which forms a shared data streaming device. The conference controller may be configured to control the shared data streaming device such that the shared data streaming device transmits the same data stream to the more than one telecommunication end-point device.

The data streaming devices may be configured to decode an encoded audio stream of the encoded data from at least one of the telecommunication end-point devices to form a decoded audio stream. The data streaming devices may be configured to calculate an audio energy level from the decoded audio stream.

The data streaming devices may be configured to transmit to the plurality of telecommunication device end-point devices a predetermined maximum number of audio data streams originating from the plurality of telecommunication device end-point devices representing the loudest audio determined from the calculated audio energy level. The predetermined maximum number may be between 2 and 10. The data streaming devices may be configured to transmit to the plurality of telecommunication device end-point devices only audio data streams encoding a sound energy level above a predefined threshold. The data streaming devices may not encode video.

The telecommunication end-point devices may be configured to encode data streamed to the plurality of data streaming devices to provide error correction information. The error correction information may comprise forward error correction. Advantageously, this arrangement avoids request for keyframes. The telecommunication end-point devices may be further configured to detect a user of the telecommunication end-point device beginning to speak and, in response, perform one or more of the following: provide a keyframe in the encoded video stream; start an intra-frame refresh cycle of the encoded video stream; provide an indication in the encoded video stream of the start of a periodic intra-frame refresh cycle. The indication may be added to a header of the encoded video stream. The header may comprise a real-time transport protocol, RTP, header.

The telecommunication end-point devices may be further configured to detect a user of an telecommunication end-point device beginning to speak if an energy level of the audio stream generated from the telecommunication end-point device changes above a predetermined level. The plurality of data streaming devices may each comprise a storage device for storing a predetermined period of encoded data from at least one of the telecommunication end-point devices. The telecommunication end-point devices may be further configured to request at least some of the predetermined period of encoded data stored in the storage device. The predetermined period of encoded data stored in the storage device may comprise a keyframe. The data streaming devices may be configured to store a period of encoded data comprising encoded video on receipt from a telecommunication end-point device of an indication in the encoded video stream of the start of a periodic intra-frame refresh cycle. The telecommunication end point devices may be configured to receive and output audio energy level of encoded audio stream of the encoded data from the telecommunication end-point devices. The telecommunication end point devices may be configured to determine the telecommunication end point device of a current speaker based on the audio energy level of encoded audio stream of the encoded data from the telecommunication end point devices.

At least one of the telecommunication end-point devices may act as a proxy for an otherwise incompatible end-point device.

In another aspect of the present invention, there is provided a data streaming device for streaming encoded data from at least one telecommunication end-point device to at least one other data streaming device and/or to at least one other telecommunication end-point device, the data streaming device comprising an interface for interfacing with a controller and receiving control signals from the controller, the data streaming device being configured such that the control signals: control the forming of telecommunication connections between telecommunication end-point devices and other data streaming devices; and encoded data streamed along the formed telecommunication connections.

The data streaming device may be further configured to stream encoded data to a plurality of telecommunication end-point devices. The data streaming device may be further configured to stream encoded data to the nearest plurality of telecommunication end-point devices and/or plurality of telecommunication end-point devices with the lowest data transmission latency. The data streaming device may be further configured to decode an encoded audio stream of the encoded data from at least one of the telecommunication end-point devices to form a decoded audio stream. The data streaming device may be further configured to calculate an audio energy level from the decoded audio stream. The data streaming device may be further configured to transmit to the plurality of telecommunication end-point devices a predetermined maximum number of audio data streams originating from the plurality of telecommunication end-point devices representing the loudest audio determined from the calculated audio energy level. The predetermined maximum number may be between 2 and 10. The data streaming devices may be configured to transmit to the plurality of telecommunication device end-point devices only audio data streams encoding a sound energy level above a predefined threshold. The data streaming device may not encode video.

The data streaming device may further comprise a storage device for storing a predetermined period of encoded data from at least one of the telecommunication end-point devices. The predetermined period of encoded data stored in the storage device may comprise a keyframe. The data streaming device may be further configured to store a period of encoded data comprising encoded video on receipt from a telecommunication end-point device of an indication in the encoded video stream of the start of a periodic intra-frame refresh cycle.

In a yet further aspect of the present invention, there is provided a controller for controlling a telecommunications network, the controller being configured to control: forming of telecommunication connections between at least some devices on the network, the devices including: a plurality of telecommunication end-point devices, and a plurality of data streaming devices each for streaming encoded data from at least one of the telecommunication end-point devices to at least one other of the data streaming devices and/or to at least one other of the telecommunication end-point devices; the controller being further configured to control: data streams along the formed telecommunication connections; forming of a telecommunication connection between telecommunication end-point devices via at least one of a plurality of data streaming devices; and encoded data streamed along the formed telecommunication connection between telecommunication end-point devices.

In a yet further aspect of the present invention, there is provided a telecommunication end-point device, such as a video phone or the like, the telecommunication end-point device comprising: at least one input configured to receive from a telecommunication network a plurality of independent encoded video streams and a plurality of independent encoded audio streams; a video decoder for decoding encoded video, the video decoder being configured to decode the plurality of encoded video streams received at the input and construct a composite image from the decoded video streams; and an audio decoder for decoding encoded audio, the audio decoder being configured to decode the plurality of encoded audio streams received at the input and mix the decoded audio streams together.

The telecommunication end-point device may further comprise a display configured to, in use, display the composite image. The telecommunication end-point device may further comprise at least one output configured to output to a telecommunication network at least one encoded video stream. The telecommunication end-point device may further comprise at least one video encoder configured to encode a video stream at a plurality of data rates and output the so encoded video stream from the at least one output. The telecommunication end-point device may be further configured to detect a user of the telecommunication end-point device beginning to speak and, in response, perform one or more of the following: provide a keyframe in the encoded video stream; start an intra-frame refresh cycle of the encoded video stream; provide an indication in the encoded video stream of the start of a periodic intra-frame refresh cycle. The indication may be added to a header of the encoded video stream. The header may comprise a real-time transport protocol, RTP, header.

The telecommunication end-point device may be further configured to detect a user of the telecommunication end-point device beginning to speak if an energy level of the audio stream generated from the telecommunication end-point device changes above a predetermined level. The telecommunication end-point device may be further configured to encode data streamed to the plurality of data streaming devices to provide error correction information. The error correction information may comprise forward error correction.

In a yet further aspect of the present invention, there is provided a method of telecommunication between telecommunication end-point devices on a telecommunication network, the telecommunication method comprising a controller forming part of a telecommunication network controlling: the forming of a telecommunication connection between telecommunication end-point devices via at least one of a plurality of data streaming devices; and encoded data streamed along the formed telecommunication connection between telecommunication end-point devices.

In summary, examples of the telecommunication network described herein provide forward error correction to avoid requests for keyframes. The example telecommunication network provides semantic hints from the audio stream to influence keyframe generation or intra refresh cycle initiation. The example telecommunication network provides a video packet cache or storage device at the OPS to replay recent video packets to an endsystem requesting a keyframe. The example telecommunication network provides marking of RTP packets by the transmitting endsystem to signal the start of an intra refresh cycle, used by the OPS to optimise the cache. The example telecommunication network provides local decoding of audio streams at the OPS for audio energy level calculation. The example telecommunication network provides transmission of additional audio energy level metadata along with a compressed audio stream by the endsystem for efficiently choosing the current speaker. The example telecommunication network may include a network device which acts as a proxy for a legacy video endsystem by performing the functionality of a videophone or other end-point device as described below.

BRIEF DESCRIPTION OF THE DRAWINGS

The invention will be described in more detail, by way of example, with reference to the accompanying drawings, in which.

DETAILED DESCRIPTION

Embodiments of the invention will now be described with reference to FIG. 4.

Figure 4:
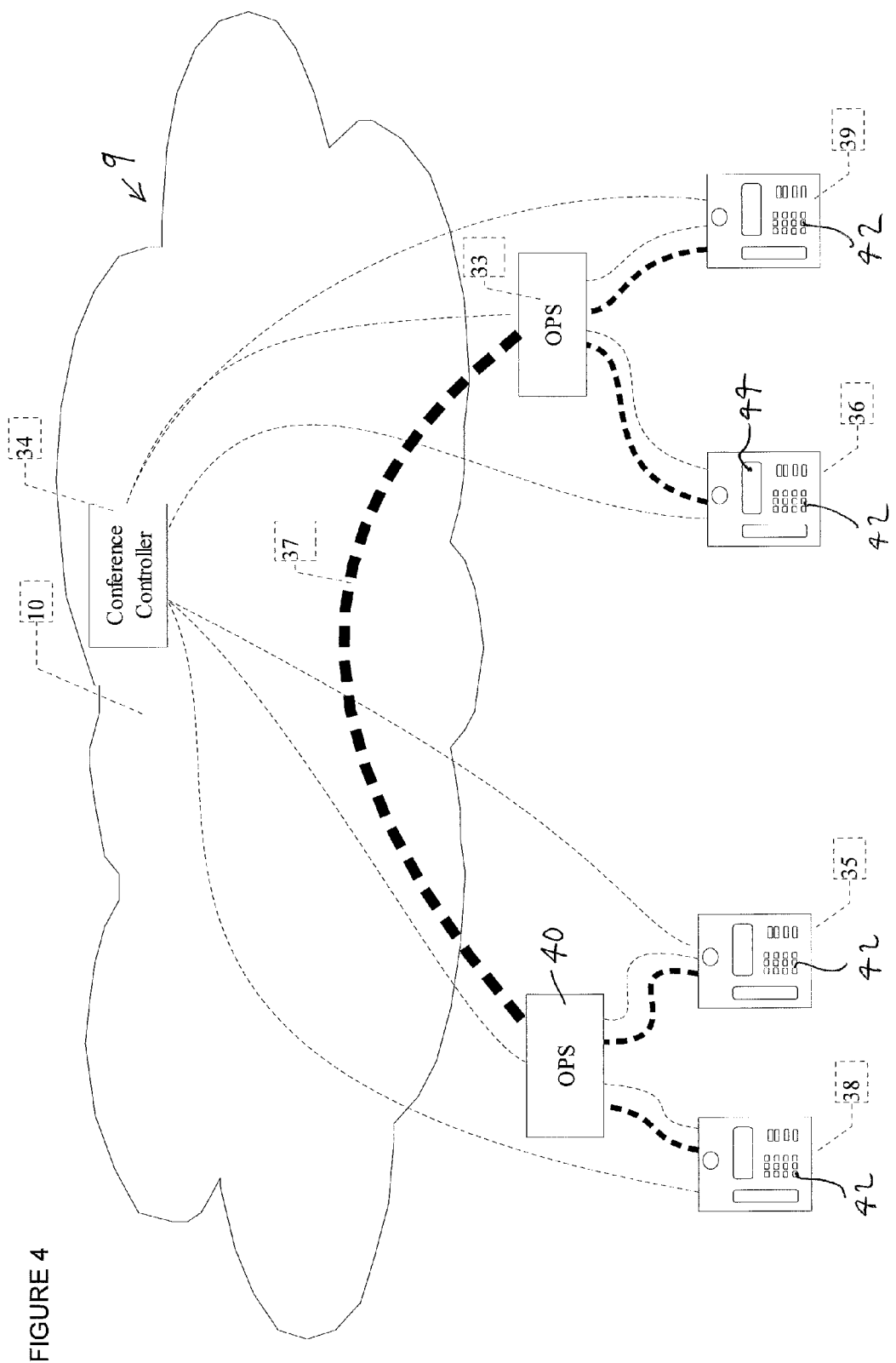
FIG. 4 is a schematic diagram of a telecommunication network embodying an aspect of the present invention.

FIG. 4 illustrates a telecommunication network 9 for telecommunication including video and audio or voice communication between telecommunication end-point devices, in this example, video endsystems 35,36,38,39 such as videophones, on the telecommunication network. The telecommunication network is configured for a conference or multiparty (more than two party) video call.

The telecommunication network 9 has a plurality of data streaming devices or optimising packet switches (OPSs) 33,40 that each form a node in the network. Each of the data streaming devices comprises a computer or a plurality of computers on a network or alternatively they may each comprise bespoke hardware. Each of the video endsystems or videophones 35,38;36,39 connect to their local OPS 40;33. The data streaming devices receive encoded data including both audio and video data, process encoded data including both audio and video data and transmit encoded data including both audio and video data. However, they do not include a video encoding capability; they cannot encode video. They are a resource shared by a plurality of video endsystems.

The OPSs each stream encoded data (video and audio) from at least one of the videophones local to them to at least one other of the OPSs and/or to at least one other of the videophones local to it. The OPSs are connected together by a communication connection 37 via the Internet 10 (or other network). Each OPS contains, in at least one storage device or memory, a table of connections between itself and videophones, a table of connections between itself and other OPSs, and a list of sources and targets either of which may be a videophone or another OPS. Each OPS copies each of the sources under the direction of the controller 34 to zero or more targets, which are involved in the same conference video call.

The telecommunication network 9 also includes a controller or conference controller 34 that controls the forming of telecommunication connections between videophones 35,36, 38,39 and OPSs 33,40 on the network and data streams along the formed telecommunication connections. The controller may comprise a computer or a plurality of computers on a network or they may comprise bespoke hardware. All components (video phones and OPSs) are controlled by the controller or conference controller 34. The OPSs or data streaming devices each have an interface for interfacing with the controller and receiving control signals from the controller. It is these control signals that control the forming of telecommunication connections between telecommunication endpoint devices and other data streaming devices and encoded data streamed along the formed telecommunication connections. The controller has a communication connection to all OPSs and videophones or endsystems in the network.

The endsystems or videophones 35,36,38,39 on the network 9 are configured to construct a composite image from a plurality of independent incoming video streams. The endsystems or videophones are also configured to decode and mix a plurality of incoming audio streams. In order to do this, the video phones have an input or network interface that receive from the network a plurality of independent encoded video streams and a plurality of independent encoded audio streams. The videophones have a video decoder that decodes the plurality of encoded video streams received at the input and constructs a composite image from the decoded video streams; and an audio decoder that decodes the plurality of encoded audio streams received at the input and mixes the decoded audio streams together.

The videophones 35,36,38,39 may also be configured to include one or more of the following features: encode video at multiple data rates or bitrates, send or transmit audio energy hinting from the network interface, use semantics of the audio stream (that is, a user starting to speak) to control injection or production of a keyframe or a start of an intra refresh cycle and/or mark or indicate the start of a periodic intra refresh cycle in the packet or RTP (real time packet) header.

In use, the conference controller 34 controls the forming of telecommunication connections between video phones 35,36,38,39 via at least one of the OPSs 33,40, and encoded data streamed along the formed telecommunication connection between videophones using control signals as described above.

A multiparty conference is typically requested by a conference host entering a phone number or other identifier of the other parties into a keypad or keyboard 42 of a video phone 35,36,38,39 operated by the conference host.

When a new multiparty conference is requested between video phones 35,36,38,39, the conference controller 34 uses information about the geographical location of the video phones or endsystems, or some other configuration policy, to instruct them to send their media or data streams to their local OPS 33,40. The local OPS may be, for example, the physically closest or nearest OPS or the OPS to which data can be transmitted with the least latency. Maintenance of service level agreements may also be considered in the choice of the best OPS for an endsystem.

The data stream includes an audio stream and a video stream. The endsystems or video phones 35,36,38,39 each send at least one video stream to their local data streaming device or OPS 33,40, but typically a plurality of video streams are sent. Typically, these video streams are of different data transmission rates or bitrates, but of the same images. That is to say, the same images encoded in a different way. For example, a high resolution/high bitrate stream, and a low resolution/low bitrate stream. That is to say, a video stream including a representation of the same video data at a plurality of different data rates. Audio is typically only provided at a single data rate (as in this example), but it may be provided at a plurality of data rates (in which case the data rate provided is determined in a similar way to the video stream as described below).

If no endsystem or video phone 35,36,38,39 has requested that they receive a data stream from a particular endpoint or other video phone, then the OPS 33,40 drops that stream; the data stream is not transmitted onwardly from the OPS. The endsystem could also be told to stop transmitting the video stream.

The endsystems or video phones 35,36,38,39 participating in the conference negotiate with the conference controller 34 for the data streams and, in particular the video stream data rate that they would like or are able to receive. In this negotiation, one or more criteria or requirements for the negotiation are provided by the video phones to the controller in the form of electrical signals. The controller considers the one or more criteria received from the videophones participating in the conference and taking into account the one or more criteria determines the data rates of the data streams and, in particular, the video streams that the video phones receive. This negotiation may be affected by criteria or requirements related to, for example: user choice (user of a particular end point or videophone by making a particular selection on the endpoint or video phone), policy decision or predetermined criterion, service level agreement, and/or network bandwidth requirements. The negotiation continues throughout the duration of the conference allowing the data stream choice to change to include the most appropriate video stream (as described above different audio streams or sources may be determined or data rate including video and audio as a whole).

Once the list of source endsystems or video phones 35,38 is identified for a particular target endsystem or video phone 36, the conference controller 34 adds this list to the appropriate tables in the OPSs or data streaming devices 33,40. This causes the OPSs to start forwarding the requested video and audio streams from the source endsystems 35,38 to the target endsystem 36.

The target endsystem 36 receives all of these streams including audio and video at a plurality of different data rates. The target endsystem constructs a composite image based on all of the video streams being received. This composite image is displayed on a display 44, typically a liquid crystal display (LCD), of the target endsystem.

For example, for a three or more party conference a target endsystem 36 requests a high resolution (high data rate) stream from the current speaker, and low resolution (relatively low data rate) streams from the other (currently nonspeaking) participants or endsystems. The endsystem constructs a composite image from these high and low resolution streams.

The conference controller 34 controls the OPSs 33,40 such that if more than one participant sharing the same OPS with at least one other participant requests the same data stream from an endsystem 35,36,38,39 on a remote or other OPS, then only one copy or instance of the stream travels or is transmitted from the remote OPS to the local OPS, and the local OPS duplicates the stream to the more than one requesting endsystems.

Video streams transmitted through the telecommunication network 9 are temporally compressed assuming that, usually, most of the content of each frame is similar to the previous frame. This is because with video phones, generally, the video to be streamed or transmitted is of a person's head moving slightly as they speak or listen to other speakers, This gives rise to the use of the known arrangement of frames or parts of frames which can be decompressed in isolation (so called key frames or intra frames), and other frames or parts of frames which can only be decompressed only with reference to previously received frames (so called predicted frames, which typically represent only the differences of the current frame from other frames). Keyframes are much larger in terms of data size than predicted frames. Many predicted frames are typically sent between each key frame resulting in a significant reduction in the total data amount that is required compared to transmitting or streaming key frames only.

Figure 1:
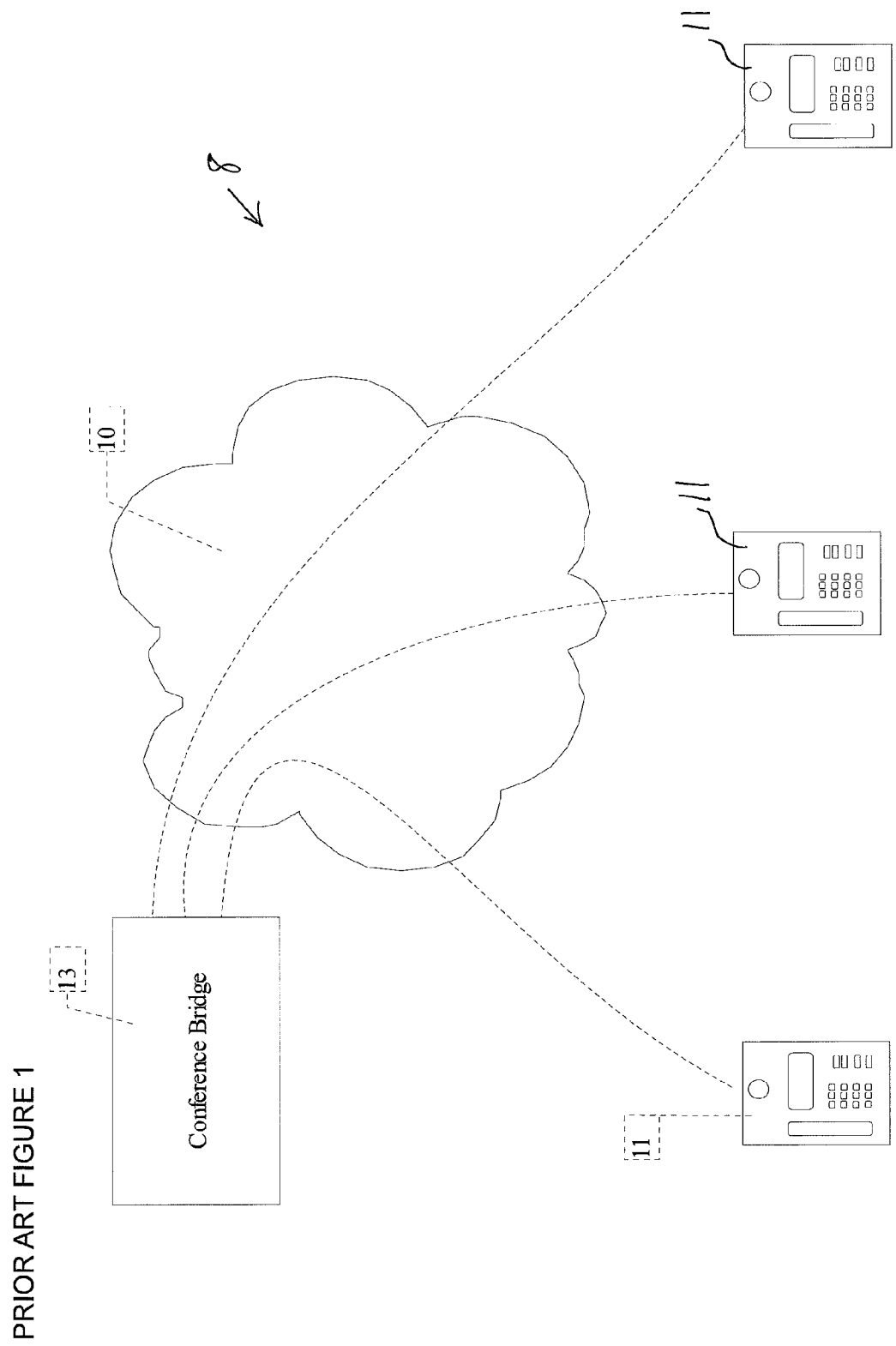
FIGS. 1 to 3 (prior art) are schematic diagrams of known video conference arrangements.
Figure 2:
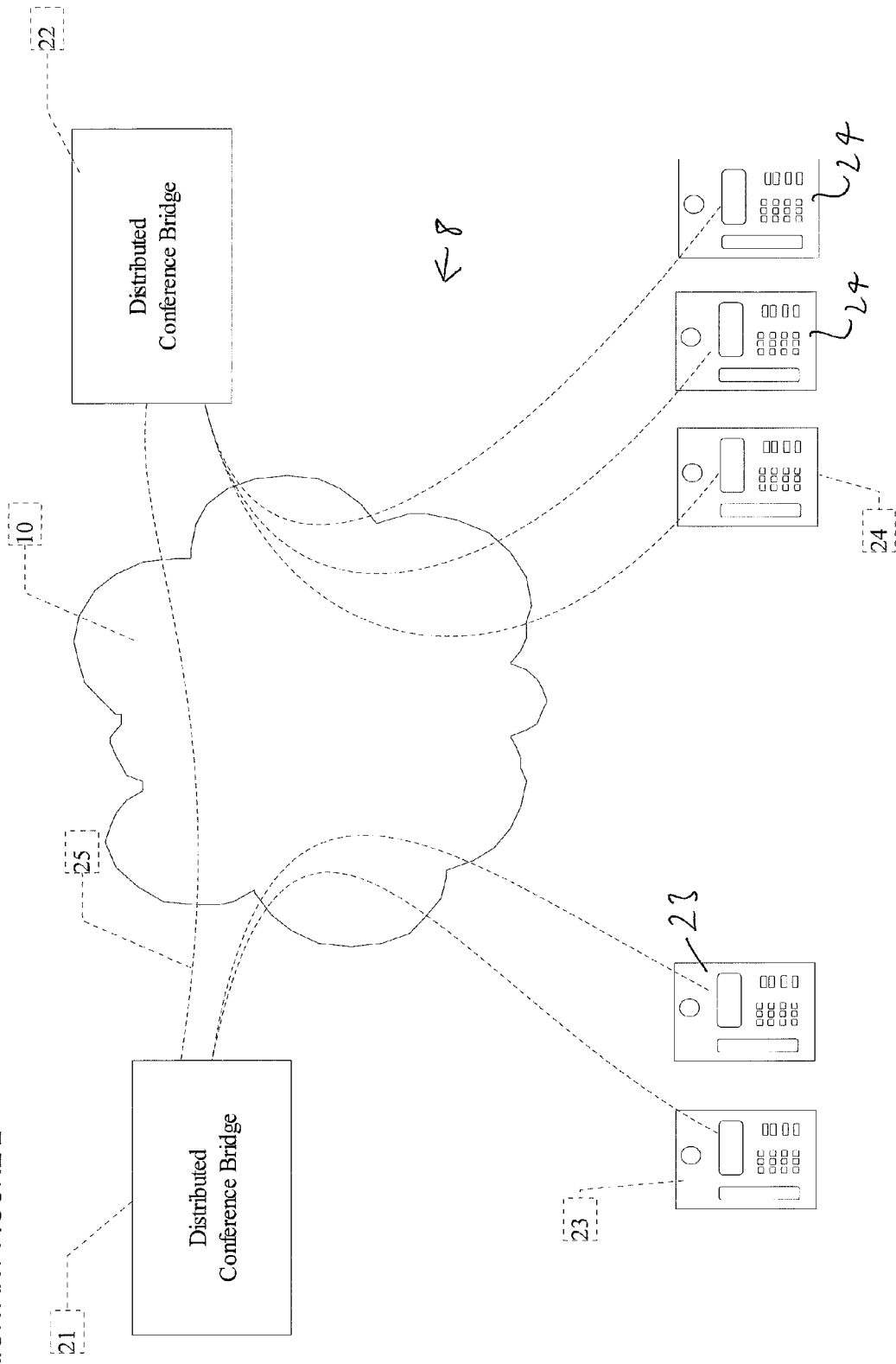
Figure 3:
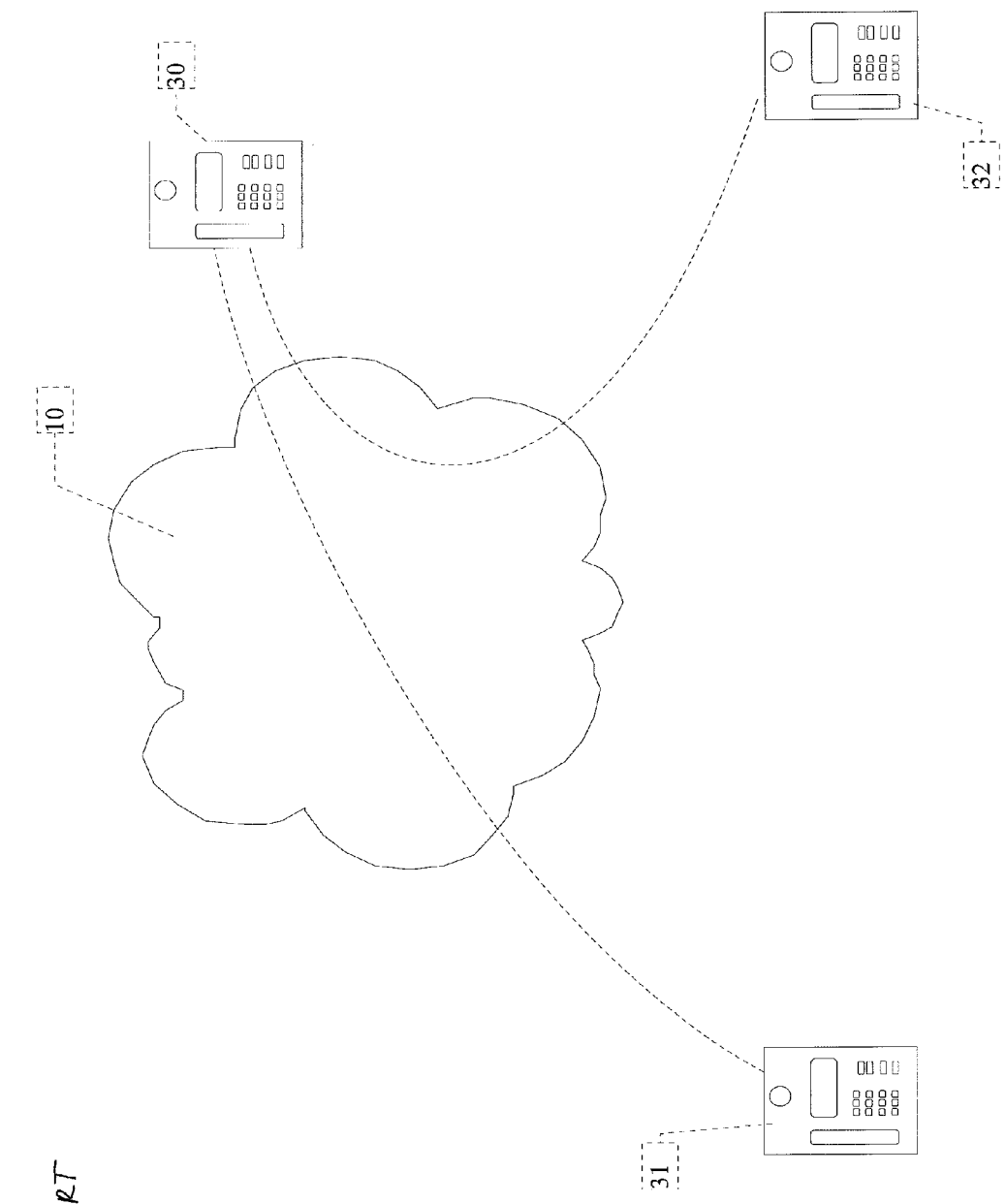

One of the tasks of the known conference bridge arrangements of the prior art of FIGS. 1 to 3 is to handle the requirement for endsystems to be sent a key frame at the start of a new stream (when there is a significant change in the video, for example, when the speaker changes). Also, if a data packet is accidentally dropped, which is fairly common during data transmission over the Internet, then a key frame may be needed to recover from that situation. This is achieved in the arrangements of the prior art through a direct request from the endsystems to the conference bridge as there is a direct communication path between the source of the data stream (the conference bridge) and the target (the end systems).

However, in the telecommunication network 9 described above, there is no centralized bridge as the video streams come directly from the source endsystems or video phones 35,38. Nevertheless, the requirement remains for a target endsystem 36 to be given a key frame quickly from the source if the target decides to use a new video or data stream or if a stream is corrupted, for example a data packet is dropped or lost as described above.

This is addressed by some combination of the following arrangements.

In one arrangement, a communication path (not shown in FIG. 4) is provided between endpoints or video phones 35,36, 38,39 and a receiving or target endpoint 36 may request a key frame from the originating or source endpoint. This arrangement has the advantage of being simple to implement. This is because all that is required is that the receiving endpoint can send a backchannel message to the originator requesting that a key frame be regenerated. Video codecs of known endsystems already provide support for this mechanism or arrangement since it is desirable even for point-to-point video calls. However, the disadvantage of this mechanism is that the key frames will be sent to all endpoints receiving that stream. As the size of a conference increases, there will inevitably be more endsystems requesting key frames and so the amount of key frames generated will increase. In this way, since key frames have a much larger data size than predicted frames, the amount of network bandwidth required will increase dramatically.

Another arrangement uses forward error correction. In forward error correction, the source encodes data to include some redundancy by including an error correcting code. Forward error correction is known as a useful addition in point-to-point calls to reduce the need of extra keyframes required as a result of dropped packets. It is even more beneficial in a multiparty conference (more then two party conference) such as the arrangement described herein since it addresses the problem described above of extra keyframes being sent to all endsystems as a result of any endsystem dropping a packet when a request is made from a target end system to a source end system for retransmission of a key frame. This arrangement does not, however, address the requirement for key frames required to start new streams.

Another arrangement uses periodic intra-frame refresh or periodic intra refresh. In a traditional keyframe, all parts of the image are generated with no reference to previous frames. This causes a sudden burst of bandwidth or data as the (large data size) keyframe is sent, followed by a trickle of data as the (small data size) predicted frames follow. In contrast, periodic intra refresh involves, over time, systematically choosing blocks within predicted frames to be sent without reference to previous frames. So, for instance, a column of image blocks could be encoded without reference to previous frames. This column starts at the left and in subsequent frames it is moved across the image. Blocks to the left of the column are never encoded with reference to blocks to the right of the column to avoid errors being allowed to persist. In this way, once the column has passed across the entire image, the recipients will have a complete version of the image even if they started with nothing.

The benefits of this are twofold. One is that there is no sudden burst of bandwidth required for keyframes, the other is that no keyframe requesting is necessary. However, the disadvantage of this arrangement is that the image is built over time, so a user or target may have to wait a noticeable time until the picture or image is complete.

A yet further arrangement is intra prediction. There are semantic or particular situations where it may be predicted that the receiving endsystems would benefit from a key frame or an immediate intra refresh. For example, if the source participant starts speaking then there is a good chance that some receiving systems will want to start using the video stream so the endsystem could automatically inject or carry out an immediate intra refresh (as described above) or a keyframe.

In the case of this periodic intra refresh technique, no keyframes are sent, so the typical keyframe marker found in real-time transport protocol (RTP) headers is not present. For this system, an additional marker or indication may be added to the RTP header to indicate the start of a refresh cycle by an endsystem or video phone 35,36,38,39. A detector in the OPS or data streaming device 33,40 detects this marker or indication and thus allows the OPSs to discard old or redundant cached or stored data for that stream.

A still further arrangement is stream caching. In this arrangement, the OPSs or data streaming devices 33,40 store in a storage device, cache or memory data stream packets since the last keyframe or the last periodic intra refresh began. In this arrangement, when an endsystem wants to receive or requests a new data stream (a different data stream of, for example, a different speaker), it is supplied immediately following the request with recent stored packets for that stream allowing it to build the required image quickly. Since this arrangement is a performance optimisation, storage of these packets or data stream of a predetermined period in a store of the OPS may involve a heuristic algorithm which trades available storage space or capacity against likely usage or requests of the packets.

In a known multiparty videoconference using a conference bridge as described with reference to FIGS. 1 to 3, the audio streams are often used to identify the current speaking party in order for the receiving endsystems to identify that party by either switching to a full-screen image of them or making their image larger. The decision is usually made by the centralized conference bridge because it receives all the audio streams. The bridge may also perform audio processing such as gating (ignoring an incoming audio signal which is quieter than a particular threshold to avoid cumulative background noise from several participants) and normalization (amplifying or attenuating an audio signal to match it to the volume level of other participants).

In the telecommunication network 9 described herein, there is no centralized conferencing bridge. In this network, identification of the current speaker and the audio processing is carried out by the OPSs or data streaming devices 33,40 and the endsystems 35,36,38,39 as described below.

With complex audio codecs used in video conferencing arrangements, it is not a trivial task to decode all the incoming streams to analyse them. Strategies to handle them efficiently are described below. The aim of the analysis of the audio streams is to identify the energy level of all audio streams, to not let silent streams propagate any further than necessary, and to identify to all parties in the conference who is the current speaker.

In the telecommunication network 9, the OPSs or data streaming devices 33,40 use a policy to limit the number of audio data streams being forwarded to endsystems 35,36,38, 39 to a predetermined number, such as only forwarding the ten loudest streams. The predetermined number may be, for example, between 2 and 10. Once this thinning or reducing of audio streams has been done, a small enough set of audio streams is sent to each endsystem for them each to be able to decode themselves. The endsystems then each do normalization and/or other audio processing on the streams (to, for example, determine the energy level of the audio streams and to identify the current speaker) before mixing them to present to the user.

Alternative arrangements may also be used to achieve this as described below.

The audio streams from the endsystems or video phones 35,36,38,39 may be decoded by their local OPS or data streaming device 33,40 and the audio energy level of each stream determined by the local OPS. Audio streams whose energy level does not pass a predefined threshold are dropped (not transmitted onward) by the OPS. The streams identified by this OPS to have the highest energy level may be indicated to the conference controller 34, for example by an indicator in the audio data stream, for it collate and propagate to the endsystems in the case that the current speaker changes. This arrangement enables the OPSs to automatically suppress silent audio streams. However, it requires the OPSs to have enough processing power to decode all the audio streams from the local endsystems.

An alternative arrangement is so-called audio power hinting. In this arrangement, the endsystems 35,36,38,39 generate and send additional (easily) decodable metadata or indicators, along with the audio stream, that contains an indication of the current energy level within the audio stream (audio energy hinting). This metadata or indicator is intercepted by the OPSs or data streaming device 33,40 and used in the same way as the example above.

A yet further arrangement is so-called OPS Mixing. In this arrangement, the OPSs or data streaming device 33,40 include processing facilities or a processor configured to decode, mix and re-encode the audio from the loudest local endsystems 35,36,38,39 (typically, a predetermined number of endsystems) before sending it on. This is a low bandwidth solution and is particularly advantageous over wide area network (WAN) links.

The conference controller 34 may be aware of bandwidth limitations on the links between OPSs or data streaming device 33,40. This may be used to determine whether a stream requested by an endsystem 35,36,38,39 may be delivered. Since an endsystem typically provides more than one resolution of its video stream (as described above), a choice may be made by the conference controller as to whether a lower bandwidth stream may only be transmitted to an endsystem when it has asked for a higher bandwidth stream.

Legacy or known endsystems (not shown in FIG. 4) may be incorporated into the telecommunication network 9 by means of a proxy (not shown in FIG. 4). The proxy has the capabilities of mixing several audio streams and building a composite video stream from individual streams from legacy endsystems. A legacy endsystem is instructed to send and receive video and audio via the proxy. The proxy then sends or transmits video and audio on to an OPS 33,40. Incoming audio streams from the OPS are mixed as they would be in an endsystem compatible with this conferencing system or telecommunication network. The mixed audio is then sent on to the legacy endsystem. Incoming video streams from the OPS are decoded and constructed into a new video stream which is encoded and sent on to the legacy endsystem.

An endsystem or video phone 35,36,38,39 may choose not send a video stream to its local OPS or data streaming device 33,40 if there is no other endsystem that requires the stream. This may be implemented by the endsystem containing or comprising an internal or integral OPS. This may reduce bandwidth used by the endsystem.

Parts or a portion of the conference control system or conference controller 34 may be implemented within or by the OPSs or data streaming devices 33,40.

Embodiments of the present invention have been described. It will be appreciated that variations and modifications may be made to the described embodiments within the scope of the present invention.

The invention claimed is:

1. A telecommunication network for video conference calls between telecommunication end-point devices on the telecommunication network, the telecommunication network comprising:
   devices including:
      a plurality of telecommunication end-point devices; and
      a plurality of data streaming devices each for streaming encoded data from at least one of the telecommunication end-point devices to one or more of at least one other of the data streaming devices or at least one other of the telecommunication end-point devices;
   the telecommunication network further comprising a controller for controlling:
      forming of telecommunication connections between at least some devices on the network; and
      data streams along the formed telecommunication connections;
   the telecommunication network being configured such that the controller controls:

the forming of a telecommunication connection between telecommunication end-point devices via at least one of the data streaming devices; and encoded data streamed along the formed telecommunication connection between telecommunication end-point devices as independent encoded video streams and audio streams;

wherein each telecommunication end-point device comprises:

at least one input configured to receive a plurality of independent encoded video streams and a plurality of independent encoded audio streams;

a video decoder for decoding encoded video, the video decoder being configured to decode the plurality of encoded video streams received at the input and construct a composite image from the decoded video streams; and an audio decoder for decoding encoded audio, the audio decoder being configured to decode the plurality of encoded audio streams received at the input and mix the decoded audio streams together.

2. The telecommunication network according to claim 1, wherein the telecommunication end-point devices are configured to send a plurality of data streams each at a different data rate along a formed telecommunication connection.

3. The telecommunication network according to claim 2, wherein the telecommunication end-point devices are each configured to request the controller the data rate they desire.

4. The telecommunication network according to claim 3, wherein the data rate the end-point devices desire is determined by one or more of: end-point device user choice, predetermined choice, network bandwidth or service level agreement.

5. The telecommunication network according to claim 1, wherein forming of telecommunication connections between at least some devices on the network comprises the forming of telecommunication connections between three or more telecommunication end-point devices.

6. The telecommunication network according to claim 1, wherein one or more of the plurality of data streaming devices are configured to stream encoded data to a plurality of telecommunication end-point devices.

7. The telecommunication network according to claim 1, wherein the one or more of the plurality of data streaming devices are configured to stream encoded data to at least one of nearest plurality of telecommunication end-point devices or a plurality of telecommunication end-point devices with the lowest data transmission latency.

8. The telecommunication network according to claim 1, wherein the conference controller is configured such that if more than one telecommunication end-point device of the plurality of telecommunication end-point devices sharing a data streaming device each desires the same data stream then only one instance of the data stream is transmitted to the data streaming device which forms a shared data streaming device.

9. The telecommunication network according to claim 8, wherein the conference controller is configured to control the shared data streaming device such that the shared data streaming device transmits the same data stream to the more than one telecommunication end-point device.

10. The telecommunication network according to claim 1, wherein the data streaming devices are configured to decode an encoded audio stream of the encoded data from at least one of the telecommunication end-point devices to form a decoded audio stream.

11. The telecommunication network according to claim 10, wherein the data streaming devices are configured to calculate an audio energy level from the decoded audio stream.

12. The telecommunication network according to claim 11, wherein the data streaming devices are configured to transmit to the plurality of telecommunication device end-point devices a predetermined maximum number of audio data streams originating from the plurality of telecommunication device end-point devices representing a loudest audio determined from the calculated audio energy level.

13. The telecommunication network according to claim 1, wherein the data streaming devices are configured to transmit to the plurality of telecommunication device end-point devices only audio data streams encoding a sound energy level above a predefined threshold.

14. The telecommunication network according to claim 1, wherein the data streaming devices cannot encode video.

15. The telecommunication network according to claim 1, wherein the telecommunication end-point devices are configured to encode data streamed to the plurality of data streaming devices to provide error correction information.

16. The telecommunication network according to claim 1, wherein the telecommunication end-point devices are further configured to detect a user of the telecommunication end-point device beginning to speak and, in response, perform one or more of the following:

provide a keyframe in the encoded video stream;

start an intra-frame refresh cycle of the encoded video stream;

provide an indication in the encoded video stream of the start of a periodic intra-frame refresh cycle.

17. A data streaming device for streaming encoded data for video conference calls from at least one telecommunication end-point device to one or more of at least one other data streaming device or at least one other telecommunication end-point device, the data streaming device comprising an interface for interfacing with a controller and receiving control signals from the controller, the data streaming device being configured such that the control signals:

control the forming of telecommunication connections between telecommunication end-point devices and other data streaming devices; and encoded data streamed along the formed telecommunication connections such that a plurality of independent encoded video streams and a plurality of independent encoded audio streams are streamed to each telecommunication end-point device for the end-point device to construct a composite image by decoding the encoded video stream input at the end-point device and an audio stream by decoding and mixing the encoded audio stream input at the end-point device.

18. The data streaming device according to claim 17, further configured to stream encoded data to at least one of nearest plurality of telecommunication end-point devices or a plurality of telecommunication end-point devices with the lowest data transmission latency.

19. A controller for controlling a telecommunications network, the controller being configured to control:

forming of telecommunication connections between at least some devices on the network, the devices including: a plurality of telecommunication end-point devices, and a plurality of data streaming devices each for streaming encoded data from at least one of the telecommunication end-point devices to one or more of at least one other of the data streaming devices or at least one other of the telecommunication end-point devices;

the controller being further configured to control:
data streams along the formed telecommunication connections;
forming of a telecommunication connection between telecommunication end-point devices via at least one of a plurality of data streaming devices; and
encoded data streamed along the formed telecommunication connection between telecommunication end-point devices such that a plurality of independent encoded video streams and a plurality of independent encoded audio streams are streamed to each telecommunication end-point device for the end-point device to construct a composite image by decoding the encoded video stream input at the end-point device and an audio stream by decoding and mixing the encoded audio stream input at the end-point device.

20. A telecommunication end-point device, such as a video phone or the like, for a participant of a video conference call, the telecommunication end-point device comprising:
at least one input configured to receive from a telecommunication network a plurality of independent encoded video streams from other participants in the video conference call and a plurality of independent encoded audio streams from the other participants in the video conference call;
a video decoder for decoding encoded video, the video decoder being configured to decode the plurality of independent encoded video streams received at the input from the other participants in the video conference call and construct a composite image from the decoded video streams; and
an audio decoder for decoding encoded audio, the audio decoder being configured to decode the plurality of independent encoded audio streams received at the input from the other participants in the video conference call and mix the decoded audio streams together; and
wherein the telecommunication end-point device is configured to request a plurality of different video streams each at a different data rate, and wherein the video decoder is further configured to construct the composite image from the plurality of different video streams.

21. The telecommunication end-point device according to claim 20, wherein the telecommunication end-point device is further configured to negotiate with a conference controller regarding the plurality of different video streams to be transmitted to the telecommunication end-point device.

22. The telecommunication end-point device according to claim 20, wherein the telecommunication end-point device is further configured to request at least one data rate of at least one of the plurality of different video streams based on at least one of the plurality of encoded audio streams.

23. The telecommunication end-point device according to claim 22, wherein the telecommunication end-point device is further configured to request the at least one data rate based on an indication of volume of audio of the at least one of the plurality of encoded audio streams.

* * * * *